May 6, 1969 W. D. ASHCRAFT 3,443,099
SIGNAL VERIFYING DEVICE

Filed Feb. 3, 1964

INVENTOR.
WILLIAM D. ASHCRAFT
BY
Ernest L. Brown
ATTORNEY

May 6, 1969  W. D. ASHCRAFT  3,443,099
SIGNAL VERIFYING DEVICE

Filed Feb. 3, 1964

*INVENTOR.*
WILLIAM D. ASHCRAFT
BY
*Ernest L. Brown*
ATTORNEY

United States Patent Office 3,443,099
Patented May 6, 1969

3,443,099
SIGNAL VERIFYING DEVICE
William D. Ashcraft, Placentia, Calif., assignor to North American Rockwell Corporation
Filed Feb. 3, 1964, Ser. No. 342,209
Int. Cl. G01j 1/20; H01j 39/12
U.S. Cl. 250—203                                      13 Claims This application related to patent application Ser. No. 197,950 filed May 28, 1962, by William D. Ashcraft for "Navigation Aid", now abandoned.

The device of this invention is a means for verifying that a signal, in the presence of noise, is indeed a signal. More particularly, the device of this invention is adapted to be used in conjunction with a light detector to determine that the light detector is indeed detecting a source of collimated light and not generating spurious signals.

In a specific embodiment, the device of this invention is adapted to be used with an automatic star tracker which uses a telescope and a means for scanning the focal plane of the telescope to detect the presence of a star image. In its usual embodiment, the telescope is supported upon an inertially stabilized platform.

One example of an automatic navigation device which uses automatic stellar navigation, including means for controlling the telescope pointing relative to an inertially stabilized platform, is described in United States Patent No. 2,949,030 entitled, "Gyrascopically Stabilized Optical System Platform" by R. B. Horsfall, Jr., et al.

A typical telescope scanning mechanism is shown and described in United States Patent No. 3,018,378 entitled, "Radiant Energy Scanning System," by V. A. Miller et al.

The celestial guidance problem is described in a paper entitled, "Celestial Guidance," by R. B. Horsfall, in the American Rocket Society Journal of December 1959.

The object of a star tracking system is to measure the direction of a star with respect to a reference base. During the operation of a star tracker, the assumed direction of the star, based upon the best available information, is computed. The optical axis of the telescope is pointed in the computed direction of the star. The field of view of the telescope is scanned with a small hole on the focal plane of the telescope. A photodetector such as a phototube is mounted behind the hole. When light is detected by the photosensor, it generates a signal. The light generating the signal may or may not be from a star image. Assuming that the light is from a star image, the position of the star image in the field of view relative to the optical axis may be obtained from resolvers which are responsive to the position of the scanning hole at the instant the photosensor produces a signal. The position of the hole relative to the optical axis of the telescope is then a measure of the error in the computed direction of the star and is used to reduce errors in the navigation system if, indeed, the photosensor-generated signal is produced by a star image.

It is an object of this invention to verify that the signal produced is, indeed, produced by a star image.

In a broader sense, the device of this invention may be used to verify the presence of a persistent signal in an electronic system.

It is a more particular object of this invention to provide a computer means which is adapted to verify the presence of a star signal in a photo-sensor positioned in the telescope of a star tracker.

It is to be stressed that, although the device of this invention is described in connection with a star tracker upon a stabilized platform that it has obvious applications in the automatic surveying art, and the like.

Other objects will become apparent from the following description taken in connection with the accompanying drawings in which.

Figure 1:
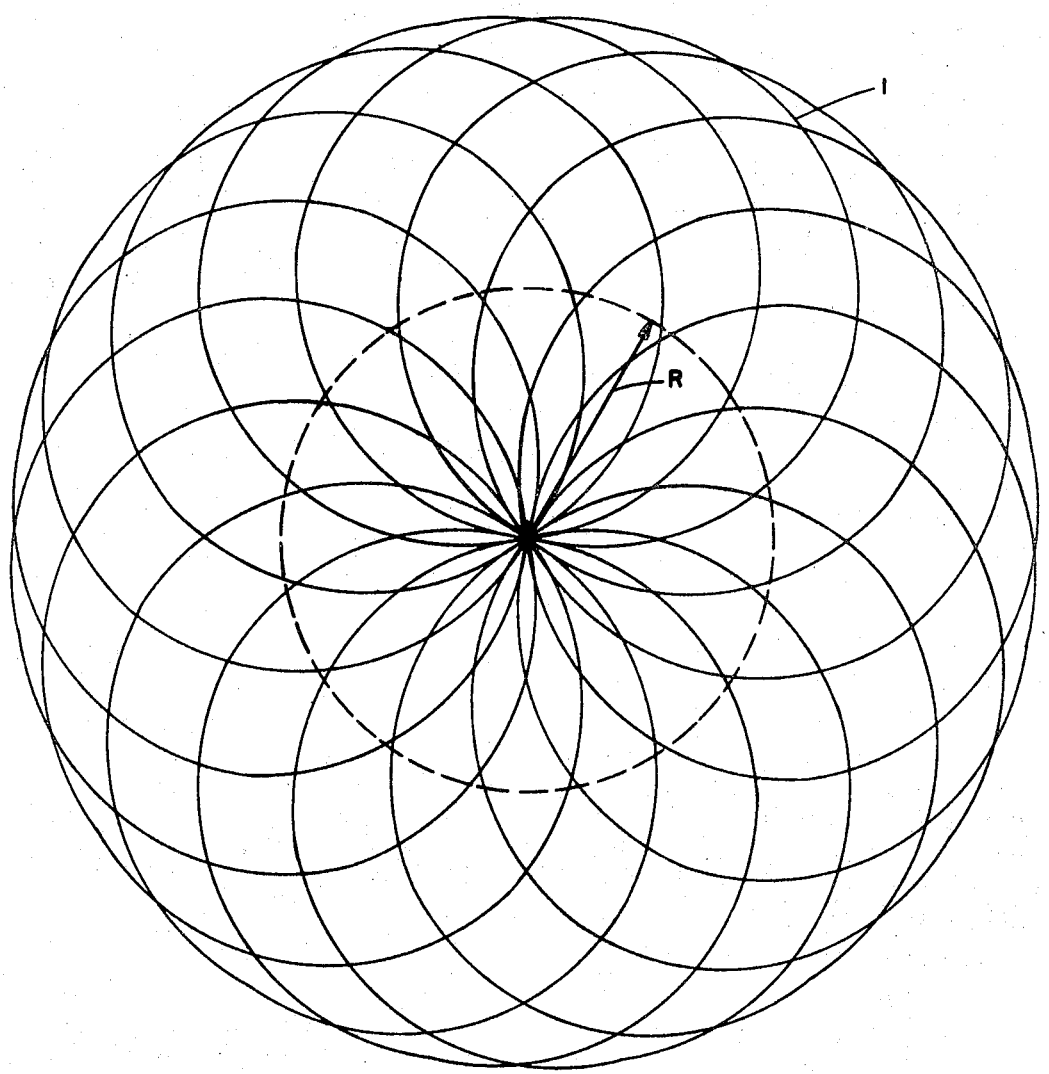
FIG. 1 shows a typical prior art scan pattern for the field of view of the star tracking telescope.

A typical scan pattern of a telescope is shown in FIG. 1, namely, a prolate epitrochoid. The prolate epitrochoid is developed from a combination of two motions, and is a member of a class of curves called roulettes, the first a rotation of a first point at a constant radius R about a fixed point at an angular velocity $\omega_1$, the second a rotation at a radius R of a second point about the first point at an angular velocity $K\omega_1$ where K is a positive integer substantially greater than one. The second point traces out the pattern of FIG. 1.

Figure 2:
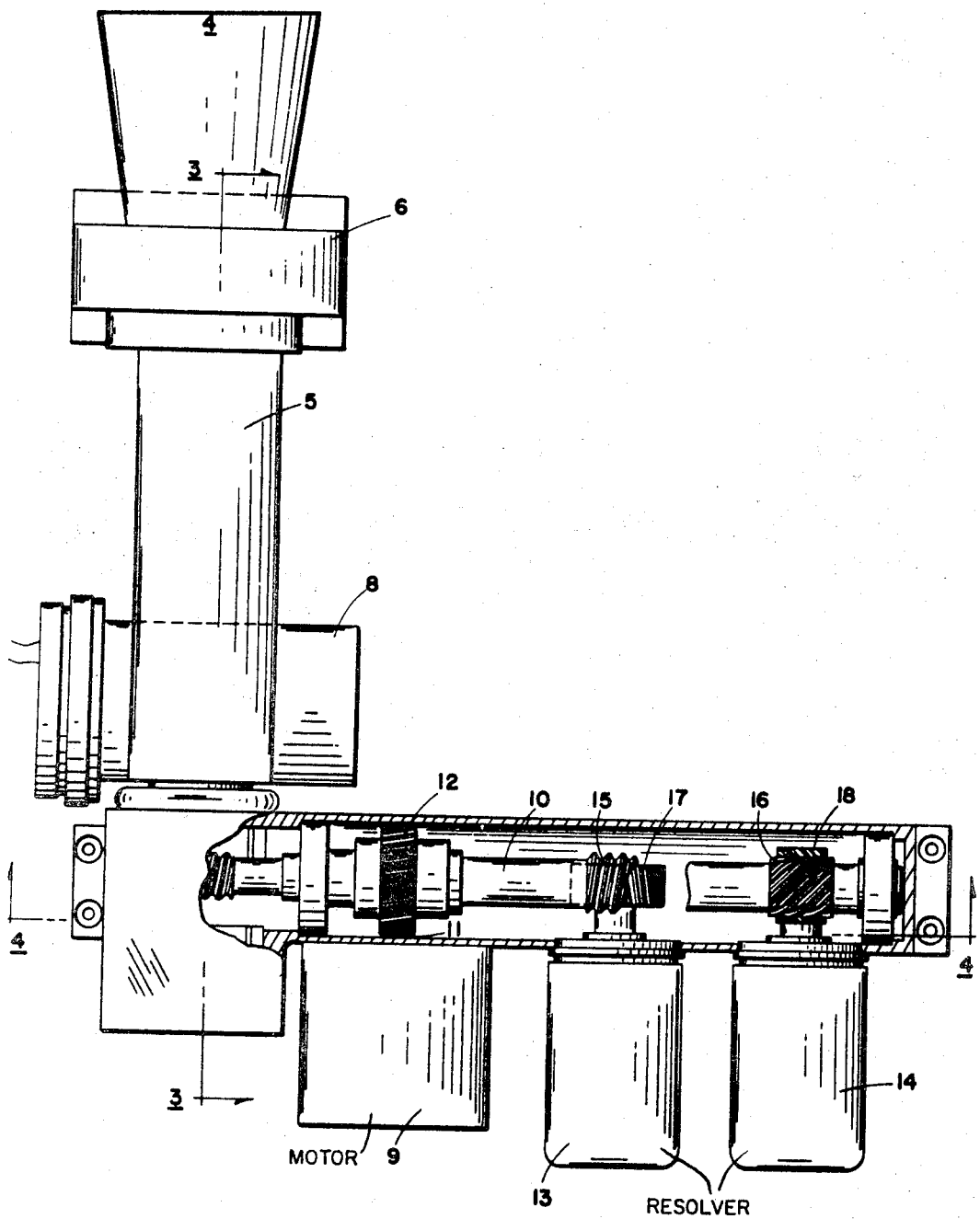
FIG. 2 shows a typical prior art star tracking telescope mounted and adapted to be wobbled to generate the scan pattern of FIG. 1.
Figure 3:
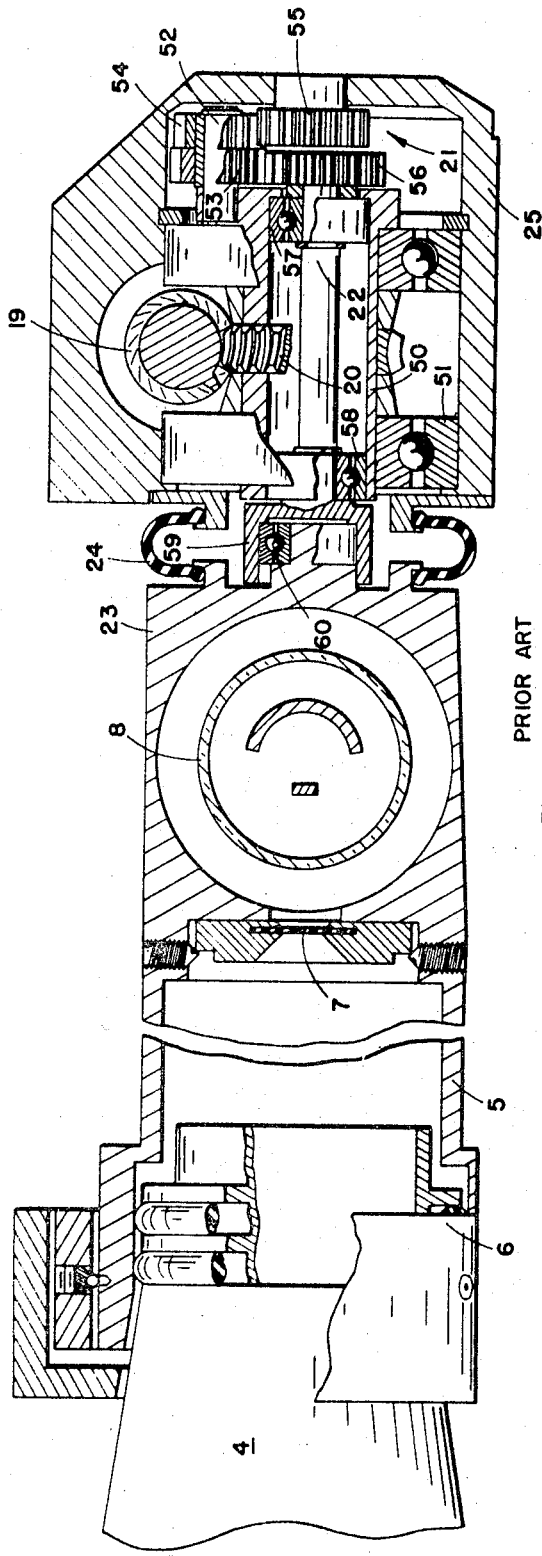
FIG. 3 is a view, partially, in section, taken at 3—3 in FIG. 2.
Figure 4:
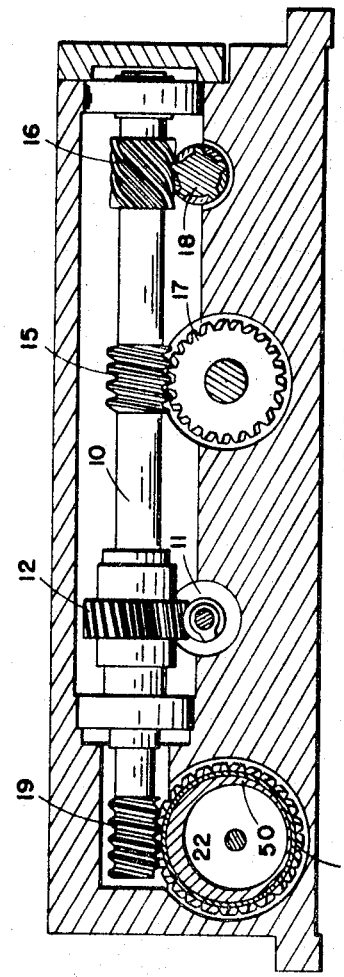
FIG. 4 is a view, partially, in section, taken at 4—4 in FIG. 2.

FIGS. 2, 3, and 4 show a mechanism adapted to scan the field of view of telescope 4 in a roulette (specifically an epitrochoidal) scan pattern. Cylinder 5 prevents the introduction of extraneous light from an outside source and is gimbaled for freedom of rotation relative to the center of the exit pupil of telescope 4 by means of gimbal or universal joint 6. Means forming hole 7 and photoelectric means 8 are rigidly connected to move with cylinder 5. Means forming hole 7 is constrained to move on the surface of a sphere whose center is at the center of the exit pupil of telescope 4, and to move within the depth of the focal plane of telescope 4. Because photoelectric means 8 does not move relative to the incident light, all light which passes through means forming hole 7 strikes the same portion of photoelectric means 8.

Cylinder 5, means forming hole 7, and photoelectric means 8 can be moved in any kind of a predetermined continuous pattern—for example—a rectangular coordinate motion of the raster type, a spiral, or a hypotrochoidal or epitrochoidal motion of scan.

A means for driving cylinder 5, means forming hole 7, and photoelectric means 8 in an epitrochoidal or a hypotrochoidal pattern is shown more particularly at the bottom of FIG. 2, the right of FIG. 3, and in FIG. 4. Mo'or 9 drives shaft 10 by means of worm 11 which engages gear 12. Shaft 10 drives resolvers 13 and 14 by means of worms 15, 16, and 18, and gear 17. The gear ratio between worm 15 and gear 17 and between worm 16 and worm 18 are such that the amplitudes of the electrical voltages generates by resolvers 13 and 14 are respectively proportional to $R \sin \omega_1 t$, $R \cos \omega_1 t$, $R \sin K\omega_1 t$, and $R \cos K\omega_1 t$.

Shaft 10 is adapted by means of worm 19 and worm gear 20 to drive epicycloidal gear train 21. Worm gear 20 is attached to cylinder 50. Cylinder 50 rotates relative to frame 25 upon bearings 51. Cylinder 50 carries with it shaft 52 upon which are mounted for rotation gears 53 and 54. Gears 53 and 54 are bearing mounted to rotate relative to shaft 52. Stationary gear 55 is rigidly attached to frame 25 and meshes with gear 54. Gears 53 and 54 are rigidly attached together to rotate at the same angular velocity relative to shaft 52. Gear 56 rotates with shaft 22 and meshes with gear 53. Shaft 22 is eccentrically mounted relative to the axis of rotation of frame 50 and is supported to be free to rotate by means of bearings 57 and 58. Frame 59 is rigidly attached to shaft 22 and is rotatingly attached to frame 23 by means of bearings 60. The axis of symmetry of frame 59 is eccentrically offset from the axis of rotation of shaft 22. It is readily seen that provided the ratio of the diameter of gear 55 to the diameter of gear 54 multiplied by the ratio of the diameter of gear 53 to the diameter of gear 56 is less than one, means forming hole 7 is driven in an epitrochoidal pattern, but if the ratio of the diameter of gear 55 to the diameter of gear 54 multiplied by the ratio of the diameter of gear 54 to the diameter of gear 56 is greater than one, means forming hole 7 moves in a hypotrochoidal pattern. Annulus 24 is merely a dust cover.

Figure 6:
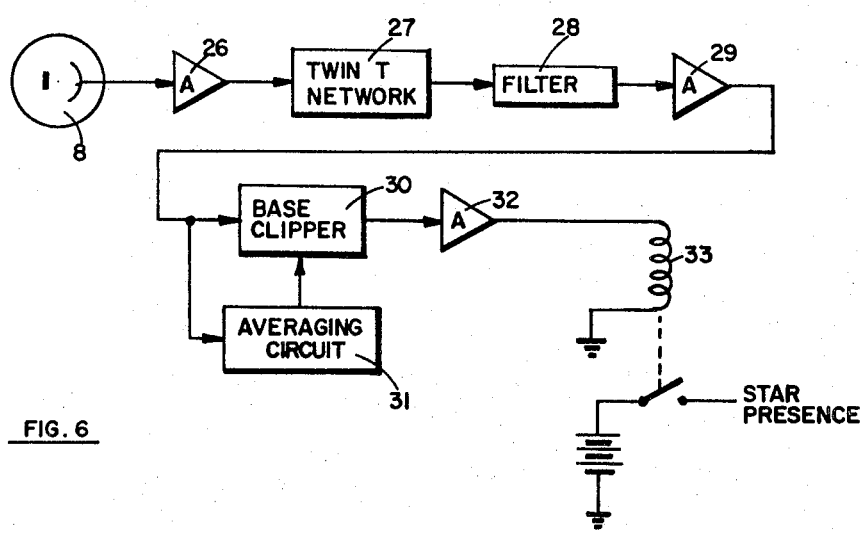
FIG. 6 is a block diagram of a typical electronic circuit adapted to generate a signal indicating the presence or absence of a star image on the focal plane of the telescope of FIG. 2.

In FIG. 6, when, for example, the image of a star is crossed by means forming hole 7, photoelectric means 8 is momentarily energized. The electrical output of photoelectric means 8 is connected through amplifier 26 to the input of twin T network 27. Twin T network 27 is tuned to reject signals which have a frequency equal to the fundamental scan frequency to eliminate extraneous noise and first order gradient effects which have that particular frequency. Since the star signal is high in harmonic content, it passes through network 27. The output of network 27 is connected to the input of filter 28 which is preferably a resistance-capacitance filter. Filter 28 is a low-pass filter which rejects all frequencies above that necessary to resolve the signal in the presence of background noise. The output of filter 28 is connected through amplifier 29 to base clipper 30 and to averaging circuit 31. Averaging circuit 31 biases base clipper 30 so that the base clipper 30 cuts off the majority of the noise present in the signal. The output of base clipper 30 is then connected through amplifier 32 to relay 33. Hence, relay 33 is only energized at the particular instant when means forming hole 7 intercepts the image of the star.

Figure 5:
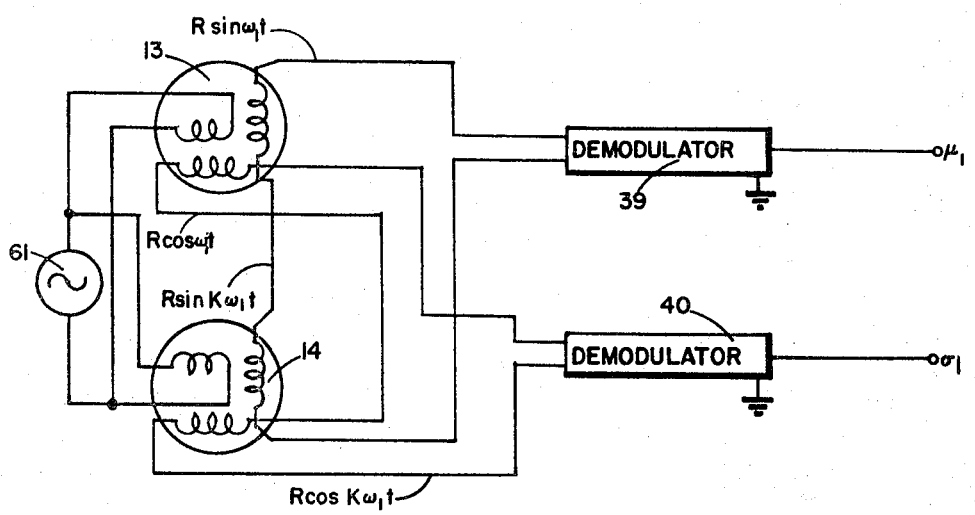
FIG. 5 is a circuit diagram showing a typical connection of the resolvers used on the telescope of FIG. 2.

In FIG. 5, the rotating coil of resolver 13 and the rotating coil of resolver 14 are excited by means of alternating current voltage source 61. The stationary coils of resolvers 13 and 14 have induced in them a voltage, which has a magnitude proportional to the sine and cosine of their shaft rotations. Hence, as shown in FIG. 5, the electrical output voltages of resolver 13 are proportional to $R \sin \omega_1 t$ and $R \cos \omega_1 t$. The electrical output voltages of resolver 14 are proportional to $R \sin K\omega_1 t$ and $R \cos K\omega_1 t$. The sine output voltage of resolver 13 is connected in series with the sine output voltage of resolver 14. The cosine output voltage of resolver 13 is connected in series with the cosine output voltage of resolver 14. The sum of the sine voltages is connected through demodulator 39 to generate signal $\mu_1$. The sum of the cosine voltages is connected through demodulator 40 to generate signal $\sigma_1$. Signals $\mu_1$ and $\sigma_1$ are measures of the distance the star image is off of the optical axis in a rectangular coordinate system which is the same coordinate system as that used to point the optical axis of the telescope.

Figure 7:
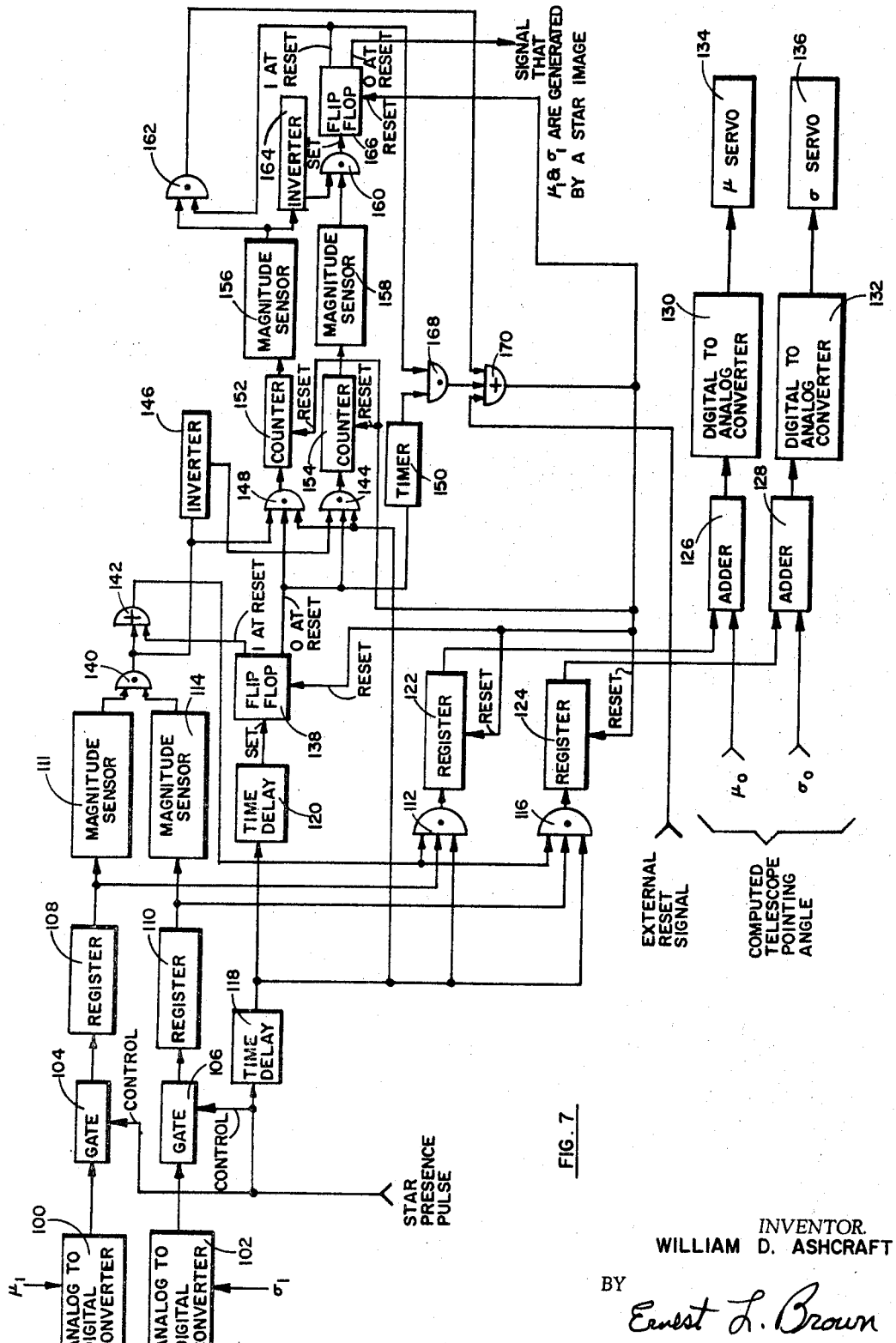
FIG. 7 is a block diagram of a typical Signal Verifying Device in accordance with this invention.

In FIG. 7, the output signals, $\mu_1$ and $\sigma_1$, from the device of FIG. 5 are connected through a pair of analog to digital converters 100 and 102 to a pair of gates 104 and 106, respectively. The output signal from the device of FIG. 6 is connected to control the opening of gates 104 and 106. The outputs of gates 104 and 106 are connected to a pair of registers 108 and 110, respectively. The output of register 108 is connected to the input of a magnitude sensor 111 and to the input of an AND gate 112. The output of register 110 is connected to the input of a magnitude sensor 114 and to the input of an AND gate 116. The star presence pulse generated by the device of FIG. 6 is connected through a time delay mechanism 118 to the input of AND gates 112 and 116 and to the input of a second time delay mechanism 120. The outputs of AND gates 112 and 116 are connected to the inputs of a pair of registers 122 and 124, respectively. Registers 108, 110, 122 and 124 may be any of several well known types of registers commonly used in digital computers to store a digital number. In its simplest form each register may contain a plurality of interconnected multivibrators. The outputs of registers 122 and 124 are connected to the inputs of a pair of adders 126 and 128, respectively which, in turn, are connected through a pair of digital to analog converters 130 and 132, respectively, to the telescope drive servos 134 and 136, respectively. External control signals which may be obtained for example, from a guidance computer are connected to the input of adders 126 and 128. A suitable guidance computer for use with the present invention is shown in the aforesaid patent to Horsfall, Jr., et al. The computer is mentioned in column 3, lines 61–64 and described in detail from column 4, line 72 to column 6, line 23. Such a guidance computer is operative to store, in preparation for a trip, the location of particular stars at preselected points along the contemplated route. Once the vehicle to be guided is under way, and has travelled for an appreciable length of time, the prerecorded program in the computer will indicate that a particular star should be at a selected angle with respect to the vehicle. This information may then be applied to the inputs of adders 126 and 128 for use in pointing telescope 4 together with the information received from the signal verifying device. The inputs of time delay 120 is connected to the SET input of a flip-flop 138. The "one at reset" terminal of flip-flop 138 is connected to the input of an OR gate 142. The output of magnitude sensors 111 and 114 are connected through an AND gate 140 to the input of OR gate 142. The output of OR gate 142 is connected to the inputs of AND gates 112 and 116. The output of AND gate 140 is also connected to the input of an AND gate 148 and through an inverter 146 to the input of an AND gate 144. The "zero at reset" terminal of flip-flop 138 is connected to the input of AND gates 144 and 148 and to the input of a timer mechanism 150. The output of AND gates 148 and 144 are connected to the inputs of a pair of counters 152 and 154, respectively. The outputs of counters 152 and 154 are connected to the inputs of a pair of magnitude sensors 156 and 158, respectively. Magnitude sensors 111, 114, 156, and 158 may be any of several well known types of devices for sensing the magnitude of a digital number and providing an indication when it reaches a predetermined value. In its simplest form each magnitude sensor may comprise a standard digital counter and a digital volt meter. The output of magnitude sensor 158 is connected to the input of an AND gate 160. The output of magnitude sensor 156 is connected to the input of an AND gate 162 and through an inverter 164 to the input of AND gate 160. The output of AND gate 160 is connected to the SET terminal of a flip-flop 166. The "one at reset" terminal of flip-flop 166 is connected to the input of AND gate 162 and to the input of an AND gate 168. The output of timer 150 is connected to the input of AND gate 168. The "zero at reset" terminal of flip-flop 166 is used to generate a signal signifying that the signals appearing at the output of registers 122 and 124 are generated by a star image. The output of AND gates 162 and 168 are connected to the input of an OR gate 170. An external reset signal may also be connected to an input of OR gate 170. The output of OR gate 170 is connected to the RESET terminals of registers 122 and 124, flip-flops 138 and 166, and counters 152 and 154.

In operation, the computed telescope pointing angles $\mu_0$ and $\sigma_0$ obtained from the best available information, such as a guidance computer explained previously are applied to the input of adders 126 and 128. An external reset signal channeled through OR gate 170 resets registers 122 and 124 to zero, sets counters 152, 154 to zero, and RESETS flip-flops 138 and 166. The telescope is moved by the $\mu$ servo 134 and by the $\sigma$ servo 136 (whose drives are not shown) so that with the $\mu_1$ and $\sigma_1$ signals equal to zero, if the computed angles were absolutely right, the image of the star would appear on the optical axis of telescope 4. The scan mechanism is then started.

When phototube 8 senses a light signal which is of the proper wave shape and intensity to energize relay 33, a pulse is produced by relay 33 which opens gates 104 and 106 to cause a digital measure of $\mu_1$ and $\sigma_1$ to be stored in registers 108 and 110. The "star presence pulse" may or may not be caused by a star image. Flip-flop 138 is in its RESET condition so that a "one" signal is channeled through OR gate 142 to the inputs of AND gates 112 and 116. After a small time delay for allowing the values of $\mu_1$ and $\sigma_1$ to appear in registers 108 and 110, the star presence pulse is applied from time delay 118 to the inputs of AND gates 112 and 116. AND gates 112 and 116 are of the type which allow signals from OR gate 142 and time delay 118 to cause the digital value stored in registers 108 and 110 to be transferred to registers 122 and 124. The values appearing in registers 122 and 124 are added by adders 126 and 128 to the values of $\mu_0$ and $\sigma_0$ to cause the $\mu$ servo 134 and the $\sigma$ servo 136 to move the telescope so that, if the signal sensed by phototube 8 were a star image, the star image would now appear in the center of the telescope. It is to be noted from the scan pattern of FIG. 1 that if the star image is centered, it is intercepted many more times than if it is not centered.

Assuming that the values on the registers 108 and 110 are greater than a predetermined magnitude, magnitude sensors 111 and 114 generates a signal at the output of AND gate 140. Obviously, if the values in registers 108 and 110 are very small, the errors in pointing the telescope are also very small. Thus, magnitude sensors 111 and 114 may be set so that only those light signals which are off of the optical axis of the telescope by a predetermined amount generate a signal at the output of AND gate 140.

After a short further delay, the star presence signal passes through time delay 120 and sets flip-flop 138. The setting of flip-flop 138 causes the circuit to enter its testing mode. In the testing mode, the telescope is continued to scan in the pattern shown in FIG. 1. Counter 154 counts the number of succeeding star presence pulses which occur at the center of the scan pattern of FIG. 1 (or rather, within a predetermined tolerance of the center as determined by the setting of magnitude sensors 111 and 114). Counter 152 counts the number of remaining star presence pulses, i.e., the number of pulses occurring away from the center of the scan pattern of FIG. 1. If the star image is now indeed at the center, counter 154 will start counting pulses at a rapid scan rate while counter 152 will count few if any pulses. If counter 154 reaches a predetermined level, determined by the setting of magnitude sensor 158, before counter 152 reaches another predetermined level, determined by the setting of magnitude sensor 156, flip-flop 166 will be set and a signal will be generated which may be used by the computer and navigation system hereinbefore described to signify that the originally measured values of $\mu_1$ and $\sigma_1$, at the position of the initially detected light signal, are correct and were measured truly from a star image and not from a noise source.

During the testing mode, the coordinates of the star signals which are registered at the center of the scan pattern of FIG. 1 are added into registers 122 and 124. If there is a drift in the star image position during the testing mode operation, this action tends to cause the star image to remain centered.

If the counter 152 reaches a predetermined critical level, as determined by the setting of magnitude sensor 156, before counter 154 reaches its predetermined critical level, as determined by the setting of magnitude sensor 158, it is more likely that the star presence pulses are being caused by noise than by a star image. If this occurs, a signal is channeled through AND gate 162 (flip-flop 166 has not been set) which, through OR gate 170 resets the entire operation into the first or search mode.

If counter 154 does not reach its predetermined critical level during a predetermined period of time determined by timer 150, the output of timer 150 is connected through AND gate 168 (flip-flop 166 has not been set) and through OR gate 170 to reset the operation into the search mode.

Thus, the device of this invention may be used to determine if a detected signal is generated by a star image or not. If not, the operation repeats itself until another signal is detected, whereupon the signal is tested and if found to be the star image, may be used to correct the guidance system, or the like.

When flip-flop 166 is set, a third mode of operation is entered. In the third mode where the indication is that the intercepted signal was generated by a star image, the coordinates registered at the center continued to be added into registers 122 and 124. This action tends to cause the star image to remain centered. Once the third, or tracking, mode has been entered, it remains until an external reset signal is applied to the input of OR gate 170.

In brief, the first mode of operation is a search for a star image; the second mode of operation is a test to determine whether the star presence pulse which occurred during mode one was caused by a star image or by noise; and mode three is a tracking mode in which the action is to keep the star image centered in the telescope field of view and to measure the error in the stars computed direction.

In its broader terms, the registers 108, 110, 122 and 124 may be characterized as a memory means, which are connected to receive signals from a photo-sensing means (such as photoelectric means 8) and from a means for signaling the coordinates of light transmitted by telescope 4 and sensed by the photo-sensing means. The memory means is adapted to store the coordinates of the light source. The logic circuit consisting of all other elements to the right of registers 108, 110 in FIG. 7 with the exception of elements 122, 124, 126, 128, 130, 132, 134, and 136 may be characterized as a testing means, operating as described above, connected to receive signals from the photo-sensing means and from the memory means, and adapted to generate a signal at the "zero at reset" terminal of flip-flop 166 indicating that consecutive signals received from the photo-sensing means are generated by a light source having the coordinates stored in the memory means whereby the persistence of light from the light source may be established.

Although the device of this invention has been described in detail above it is not intended that the invention should be limited by that description but only in accordance with the spirit and scope of the appended claims:

I claim:
1. In combination:
   a telescope having an optical axis and adapted to focus distant objects on its focal plane,
   photo-sensing means positioned to sense light transmitted by said telescope and to generate electrical signals in response to said light;
   means coupled to said telescope for signaling the coordinates in the focal plane of said telescope, relative to said optical axis, of light images on said focal plane intercepted by said telescope;
   memory means connected to receive signals from said photo-sensing means and from said means for signaling and adapted to store the coordinates of the light source which causes said signals; and
   testing means, connected to receive signals from said photo-sensing means and from said memory means, and adapted to generate a signal indicating that consecutive signals received from said photo-sensing means are generated by a light source having the coordinates stored in said memory means whereby the persistence of light from said light source may be established.

2. A device as recited in claim 1 in which the field of view of said telescope is scanned in an epitrochoidal pattern.

3. A device as recited in claim 1 and further comprising noise discriminator means connected between said photo-sensing means and both said memory means and said testing means.

4. A device as recited in claim 1 wherein said testing means includes means responsive to said memory means for providing a signal to control the pointing of said telescope.

5. In combination:
a telescope adapted to focus distant objects on its focal plane;
means for scanning, in a predetermined pattern, the focal plane portion of said telescope;
photo-sensing means positioned to sense light transmitted by said scanning means and to generate electrical signals in response to said light;
means coupled to said scanning means for signaling the coordinates of said scanning means;
memory means, connected to receive signals from said photo-sensing means and said means for signaling and adapted to store the coordinates of said scanning means, when said photo-sensing means generates a signal; and
logic circuit means, connected to receive signals from said photo-sensing means and from said memory means, and adapted to generate a signal indicating that consecutive signals received from said photo-sensing means are generated by a light source having the coordinates stored in said memory means;
whereby the persistence of a light source may be established.

6. The device as recited in claim 5 in which the field of view of the focal plane portion of said telescope is scanned to cause the photo-sensing means to receive signals representing scanning in a roulette pattern.

7. The device as recited in claim 5 and further comprising noise discriminator means connected between said photo-sensing means and both said memory means and said logic circuit means.

8. A device as recited in claim 5 wherein said means for signaling is connected to read out the coordinates of the star image, on the focal plane of said telescope, relative to the optical axis of said telescope.

9. In combination:
a telescope adapted to be pointed in the computed direction of a light source;
means for optically scanning the focal plane of said telescope;
means positioned to be responsive to said scanning means for generating signals indicating the interception of said scanning means and a light ray;
means coupled to said scanning means for generating signals which are a measure of the coordinates in the focal plane of said telescope, relative to the optical axis of said telescope, of light images on said focal plane intercepted by said scanning means;
means connected to receive said signals indicating interception and said signals which are a measure of the coordinates of light images for storing the signals which are a measure of the coordinates relative to said optical axis of said telescope;
and means for repetitively scanning the detected position of said light ray to determine its persistence.

10. In combination:
a telescope having an optical axis and adapted to focus distant objects on its focal plane;
first and second servo means attached to said telescope to point the optical axis of said telescope in the direction of a predicted light source;
photo-electric means adapted and positioned to detect light entering said telescope;
optical scanning means for scanning the focal plane of said telescope to determine the position of light images on said focal plane relative to said optical axis;
means for signaling the coordinates of said scanning means relative to said optical axis;
memory means adapted to store information received from said coordinate signaling means;
gate means, connected between said coordinate signaling means and said memory means and connected to be controlled by signals from said photo-electric means to cause said memory means to store signals from said coordinate signaling means only when a signal is received from said photo-electric means.

11. A device as recited in claim 10 and further comprising:
magnitude sensing means adapted to determine if the distance between the optical axis of said telescope and the position of a light signal on the focal plane of said telescope detected by said photo-electric means is above a predetermined magnitude;
means for controlling said first and second servo means to position said telescope so that said sensed light on the focal plane of said telescope is on the optical axis of said telescope;
means connected to cause said scanning means to scan said optical axis at a substantially different rate than other portions of the focal plane of said telescope;
counter means adapted to count the light signals detected by said photo-electric means on the optical axis of said telescope and to count the light signals detected by said photo-electric means at positions on the focal plane of said telescope not on the optical axis thereof;
and means for comparing said last named counted signals to determine if the signal on the optical axis of the telescope is a persistent one.

12. A device as recited in claim 11 and further comprising means for resetting said telescope to its initial position if the signal on the optical axis thereof is not a persistent one.

13. In combination:
a telescope, gimbaled about two axes at right angles to the optical axis thereof, said axes being designated the $\sigma$ and $\mu$ axes;
means for scanning said telescope in a roulette pattern;
photo-electric means positioned within said telescope and adapted to sense light passed by said means for scanning;
resolving means for generating signals which are measures of the position of said means for scanning relative to the optical axis, measured in $\sigma$ and $\mu$ coordinates;
gate means, connected to be responsive to signals from said photo-electric means and adapted to pass signals from said resolving means when light is detected by said photo-electric means;
first and second registers, connected to the output of said gate means to register the position of said means for scanning when light is sensed by said photo-electric means;
magnitude sensing means, connected to the outputs of said first and second registers to generate a signal when the signals in said first and second registers exceed a predetermined magnitude;
third and fourth registers, adapted and connected to receive information from said first and second registers;
servo means connected to said third and fourth registers and adapted to move the optical axis of said telescope to coincide with the position of the light sensed by said photo-electric means;
switching means, adapted to be set by signals from said photo-electric means to cause said roulette pattern scanning means to intercept said optical axis at a rapid rate compared to the rate of interception of any other portion of the field of view of said telescope;
logic means connected to said magnitude sensing means and said photo-electric means and adapted to separate signals generated by said photo-sensing means within a predetermined distance of said optical axis from signals generated by said photosensing means outside of said predetermined distance, and adapted to count the number of times light is intercepted within said predetermined distance of the optical axis of said telescope and the number of times light is intercepted outside of said predetermined distance of the optical axis of said telescope, to compare said counted interceptions, and to generate a signal indicating that said originally detected light does or does not originate at a persistent light source.

References Cited
UNITED STATES PATENTS

| | | | |
|---|---|---|---|
| 2,949,030 | 8/1960 | Horsfall et al. | 250—83.3 X |
| 2,825,021 | 2/1958 | Friend | 250—203 X |
| 2,855,521 | 10/1958 | Blackstone | 250—203 X |
| 2,857,672 | 10/1958 | McCoy | 88—1 X |
| 3,018,378 | 1/1962 | Miller et al. | 250—203 X |
| 3,099,748 | 7/1963 | Weiss | 250—203 |

WALTER STOLWEIN, Primary Examiner.

U.S. Cl. X.R.

250—214; 88—1